(12) United States Patent
Sakamoto (10) Patent No.: US 11,714,584 B2
(45) Date of Patent: Aug. 1, 2023

(54) INFORMATION PROCESSING APPARATUS WITH PRINT FAILURE REPORTING CAPABILITIES

(71) Applicant: TOSHIBA TEC KABUSHIKI KAISHA, Tokyo (JP)

(72) Inventor: Daiki Sakamoto, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/707,760

(22) Filed: Mar. 29, 2022

(65) Prior Publication Data

US 2022/0236927 A1 Jul. 28, 2022

Related U.S. Application Data

(63) Continuation of application No. 17/158,722, filed on Jan. 26, 2021, now abandoned.

(51) Int. Cl.
*G06F 3/12* (2006.01)

(52) U.S. Cl.
CPC ............ *G06F 3/121* (2013.01); *G06F 3/1234* (2013.01); *G06F 3/1253* (2013.01)

(58) Field of Classification Search
CPC ...... G06F 3/121; G06F 3/1234; G06F 3/1253; G06F 11/0766; G06F 11/0784
USPC ......... 358/3.26, 1.13, 1.14, 1.15; 399/10, 18
See application file for complete search history.

(56) References Cited

U.S. PATENT DOCUMENTS

| 2003/0128991 A1* | 7/2003 | Carling | G03G 15/5079 |
| | | | 702/182 |
| 2005/0018242 A1 | 1/2005 | Azami | |
| 2005/0094193 A1* | 5/2005 | Oswald | G06F 3/1259 |
| | | | 358/1.15 |
| 2008/0204799 A1 | 8/2008 | Sato | |
| 2012/0154835 A1* | 6/2012 | Tonegawa | H04N 1/60 |
| | | | 358/1.9 |

(Continued)

FOREIGN PATENT DOCUMENTS

| JP | 2007-037067 A | 2/2007 |
| JP | 2009-193269 A | 8/2009 |

(Continued)

OTHER PUBLICATIONS

U.S. Office Action on U.S. Appl. No. 17/158,722 dated Dec. 29, 2021.

(Continued)

*Primary Examiner* — Jamares Q Washington
(74) *Attorney, Agent, or Firm* — Foley & Lardner LLP (57) ABSTRACT

An information processing apparatus includes an input interface, a communication interface, and a processor. The input interface is configured to receive settings related to a print failure report. The communication interface is configured to facilitate communication with an image forming apparatus and a destination of the print failure report identified in the settings. The processor is configured to selectively execute a print mode for transmitting designated print data of a print object to the image forming apparatus and a report mode for transmitting print data for reporting including print log information to the destination based on the settings.

20 Claims, 7 Drawing Sheets

(56) References Cited

U.S. PATENT DOCUMENTS

| | | | |
|---|---|---|---|
| 2014/0063537 A1 | 3/2014 | Nishikawa et al. | |
| 2016/0110653 A1* | 4/2016 | Foley | G06N 7/005 706/12 |

FOREIGN PATENT DOCUMENTS

| | | |
|---|---|---|
| JP | 2017-183836 A | 10/2017 |
| JP | 2019-176364 A | 10/2019 |

OTHER PUBLICATIONS

U.S. Office Action on U.S. Appl. No. 17/158,722 dated Aug. 5, 2021.

\* cited by examiner

INFORMATION PROCESSING APPARATUS WITH PRINT FAILURE REPORTING CAPABILITIES

CROSS-REFERENCE TO RELATED PATENT APPLICATION

This application is a continuation of U.S. patent application Ser. No. 17/158,722, filed Jan. 26, 2021, which is incorporated herein by reference in its entirety.

FIELD

Embodiments described herein relate generally to an information processing apparatus.

BACKGROUND

In the related art, if a failure occurs during execution of printing from an information processing apparatus such as a laptop computer or a desktop personal computer to an image forming apparatus such as a multi-functional peripheral (MFP), a service person or a user himself or herself collects information related to the occurrence of the print failure to analyze the cause of the failure. Then, it is necessary to report the print failure as a print failure report to the service person or an administrator, which is complicated. In order to eliminate such complications, there is a demand for a mechanism capable of efficiently generating and reporting the print failure report.

DETAILED DESCRIPTION

According to an embodiment, an information processing apparatus includes an input interface, a communication interface, and a processor. The input interface receives settings related to a print failure report. The communication interface communicates with an image forming apparatus and a destination of the print failure report included in the settings. The processor selectively executes a print mode for transmitting designated print data of a print object to the image forming apparatus and a report mode for transmitting print data for reporting including print log information to the destination based on the setting.

Hereinafter, embodiments will be described in detail with reference to the drawings. In addition, in this embodiment, when the printing is executed from a personal computer (PC) to the MFP and a print failure occurs on the PC, a print failure report is generated and reported.

Figure 1:
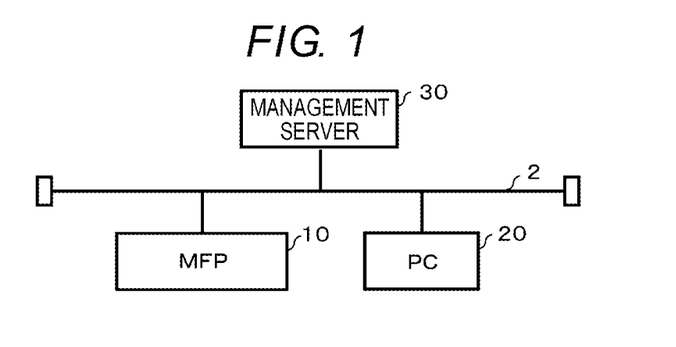
FIG. 1 is a schematic diagram illustrating a schematic configuration of an information processing system according to an embodiment.

FIG. 1 is a schematic diagram illustrating a schematic configuration of an information processing system 1 according to an embodiment. The information processing system 1 includes a plurality of MFPs 10, a plurality of PCs 20, and a management server 30. The MFP 10 is an example of an image forming apparatus. The PC 20 is an example of an information processing apparatus. The management server 30 is configured with one or a plurality of computers and manages, for example, the print log information and the like of the PC 20. A communication network 2 connects the MFP 10, the PC 20, and the management server 30 in a wired or wireless manner. For example, the Internet may be used as a part of the communication network 2.

Figure 2:
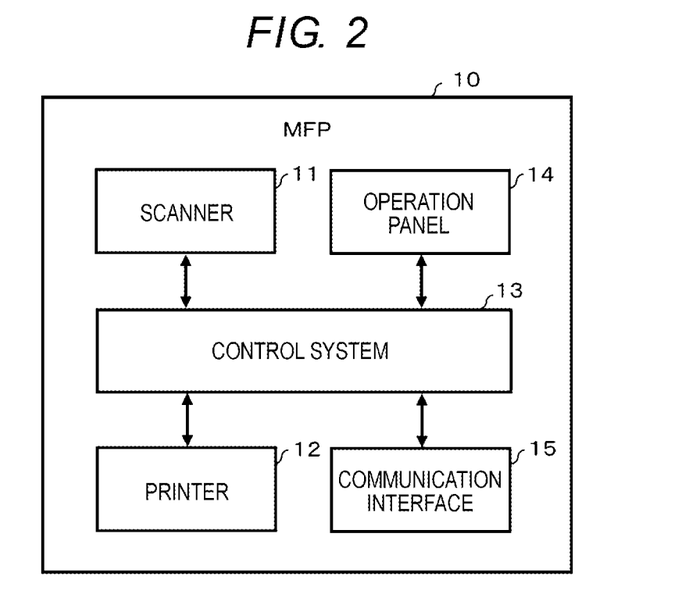
FIG. 2 is a block diagram illustrating a circuit configuration of an MFP.

FIG. 2 is a block diagram illustrating a circuit configuration of the MFP 10. The MFP 10 includes a scanner 11, a printer 12, a control system 13, an operation panel 14, and a communication interface 15. The scanner 11, the printer 12, the operation panel 14, and the communication interface 15 are connected to the control system 13.

The scanner 11 is a device that optically reads an image of a document in response to an operation instruction from the control system 13 and converts the image into image data. The scanner 11 outputs the image data of the read document to the control system 13.

The printer 12 prints an image based on the image data supplied from the control system 13 on a sheet in various print conditions designated by the control system 13. The printer 12 may be, for example, an electrophotographic printer or may be an inkjet printer, a thermal transfer printer, or the like.

The control system 13 controls the overall operations of each unit such as the scanner 11, the printer 12, the operation panel 14, and the communication interface 15. In addition, the control system 13 executes various types of processing such as image processing.

The operation panel 14 is a user interface. The communication interface 15 is an interface for performing data communication with an external device via a network such as the communication network 2. The communication interface 15 receives the designated print data transmitted from the PC 20. The designated print data is, for example, a file name of an image, an ID of the image, raster data of the image, data expressing the image in a page description language, or the like.

Figure 3:
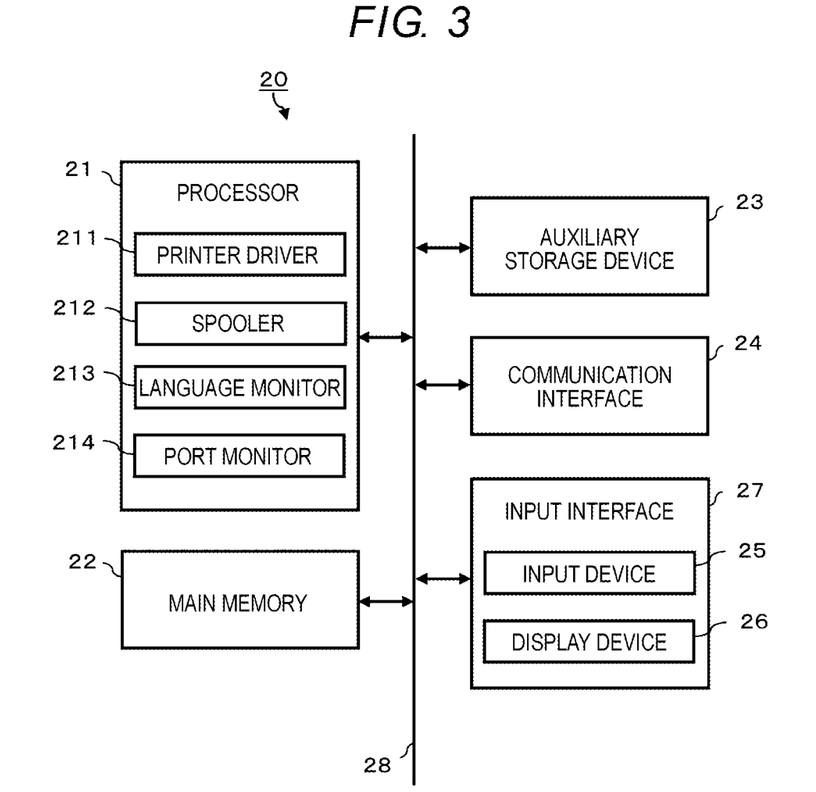
FIG. 3 is a block diagram illustrating a circuit configuration of a PC.

FIG. 3 is a block diagram illustrating a circuit configuration of the PC 20. The PC 20 includes a processor 21, a main memory 22, an auxiliary storage device 23, a communication interface 24, an input interface 27, and a system transmission line 28. The input interface 27 includes an input device 25 and a display device 26. The system transmission line 28 includes an address bus, a data bus, a control signal line, and the like. The PC 20 connects the processor 21, the main memory 22, the auxiliary storage device 23, the communication interface 24, and the input interface 27 to the system transmission line 28. The PC 20 is configured with the processor 21, the main memory 22, the auxiliary storage device 23, and the system transmission line 28 connecting the processor 21, the main memory 22, and the auxiliary storage device 23.

The processor 21 corresponds to the central part of the computer. The processor 21 controls each unit to realize various functions of the PC 20 according to an operating system or an application program. The processor 21 is, for example, a central processing unit (CPU). In addition, the processor 21 includes various units including a printer driver 211, a spooler 212, a language monitor 213, and a port monitor 214. The auxiliary storage device 23, which is a non-temporary computer-readable storage medium, stores programs corresponding to these units. The processor 21 executes a program corresponding to each unit stored in the auxiliary storage device 23 to implement a function of each unit. The processor 21 selectively executes the print mode and the report mode based on the settings related to the print failure report stored in the auxiliary storage device 23 by the function of each unit. In addition, the settings related to the print failure report, the print mode, and the report mode will be described in detail later.

The main memory 22 corresponds to a main memory portion of the computer. The main memory 22 stores the operating system or application program read from the auxiliary storage device 23. In addition, in some cases, the main memory 22 may store data necessary for the processor 21 to execute a process for controlling each unit.

The auxiliary storage device 23 is a non-temporary computer-readable storage medium and corresponds to an auxiliary storage portion of the computer. For example, an electric erasable programmable read-only memory (EEPROM), a hard disk drive (HDD), a solid state drive (SSD), or the like can be the auxiliary storage device 23. The auxiliary storage device 23 stores the operating system, the application program, data used by the processor 21 for performing various processes, data generated by the processes of the processor 21, and the like. The auxiliary storage device 23 stores the settings related to the print failure report received through the input device 25.

The communication interface 24 is a network interface for performing data communication with an external device via a network such as the communication network 2. The communication interface 24 communicates with the MFP 10 and the destination of the print failure report. The communication interface 24 transmits a print job including the designated print data of the print object and print setting conditions to the MFP 10 in response to the execution of the print mode. In addition, the communication interface 24 transmits the print data for reporting corresponding to the print failure report to the destination of the print failure report in response to the execution of the report mode.

The input device 25 is a device that functions as an input interface capable of inputting data or instructions to the PC 20. For example, the input device 25 is a keyboard, a touch panel, a mouse, a track pad, or the like. The input device 25 receives settings related to the print failure report input through the screen displayed on the display device 26.

The display device 26 is a device capable of displaying various screens under the control of the processor 21. For example, the display device 26 is a liquid crystal display (LCD), an electroluminescence (EL) display, a plasma display, or the like. The display device 26 displays a screen for receiving settings related to the print failure report.

The printer driver 211 generates the print job including the designated print data of the print object and the print setting conditions selected by the user and controls a print operation of the printer 12 of the MFP 10. The print setting conditions are, for example, a name of the MFP 10 that identifies the MFP 10 executing the printing, the size of the print sheet, the number of sheets of print, a print orientation, and the like. In addition, the printer driver 211 receives an instruction operation of print setting conditions or the like by the user through the input device 25 and the display device 26. The spooler 212 temporarily stores the print job generated by the printer driver 211 in the main memory 22 and sequentially transmits the print job to the language monitor 213. The language monitor 213 bi-directionally communicates with the MFP 10 to monitor the state of the printer 12. The language monitor 213 transmits the print job to the port monitor 214 according to the state of the printer 12. The port monitor 214 relays various data including the designated print data between the printer driver 211 and the MFP 10. The port monitor 214 transmits the designated print data included in the print job to the MFP 10. In addition, the port monitor 214 receives the state of the printer 12 from the MFP 10 and supplies the state of the printer 12 to the language monitor 213.

Before starting the operation of the information processing system 1 according to the embodiment, the user inputs settings related to the print failure report in advance through the input device 25 on the screen provided to the user through the display device 26 by the printer driver 211, and the input device 25 receives the input settings, and the auxiliary storage device 23 stores the received settings. The settings related to the print failure report include the destination of the print failure report, the information to be included in the print failure report, and the information designating whether or not to report the failure. For example, the user inputs the destination of the print failure report in advance on a destination setting screen 100 (see FIG. 4) displayed on the display device 26 through the input device 25, and the input device 25 receives the input destination. The destination of the print failure report is, for example, a uniform resource locator (URL) indicating a location on the network 2.

In addition, the user selects or inputs information to be included in the print failure report in advance on an information setting screen 200 (see FIG. 5) displayed on the display device 26 through the input device 25. The input device 25 receives the selection or input of the information to be included in the print failure report and the auxiliary storage device 23 stores the received information. The information included in the failure report is, for example, the print log information of the printer driver 211, the information of the application program, the information of the operating system, other information related to the PC 20, or a combination thereof. The information of the application program is, for example, a version of the program, an application state of an updated program, and the like. The information of the operating system includes a version of the system, an application state of an updated program, and the like. Other information related to the PC 20 includes, for example, a login user name, an IP address, domain participation, and the like.

Figure 4:
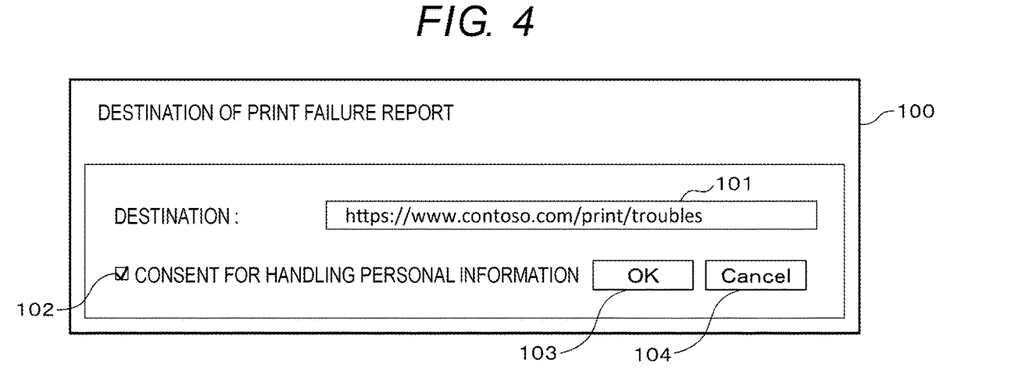
FIG. 4 is a schematic diagram illustrating an example of a destination setting screen.

FIG. 4 is a schematic diagram illustrating an example of the destination setting screen 100. As illustrated in FIG. 4, the destination setting screen 100 includes an input column 101 for inputting a destination of the print failure report and a check box 102 for expressing the consent for handling personal information and the like. For example, the user inputs a URL for specifying a storage location of a failure report on the management server 30 in the input column 101 through the input device 25. The input device 25 receives the input and the auxiliary storage device 23 stores the received information. In addition, the destination setting screen 100 includes an OK button 103 for instructing the input confirmation and a Cancel button 104 for instructing the input cancellation. The OK button 103 is enabled if the destination of the print failure report is input in the input column 101 and a check is entered in the check box 102. In addition, the content of the text data displayed in FIG. 4 is an example.

If the user inputs the OK button 103 on the destination setting screen 100, the auxiliary storage device 23 stores the data on the destination setting screen 100.

Figure 5:
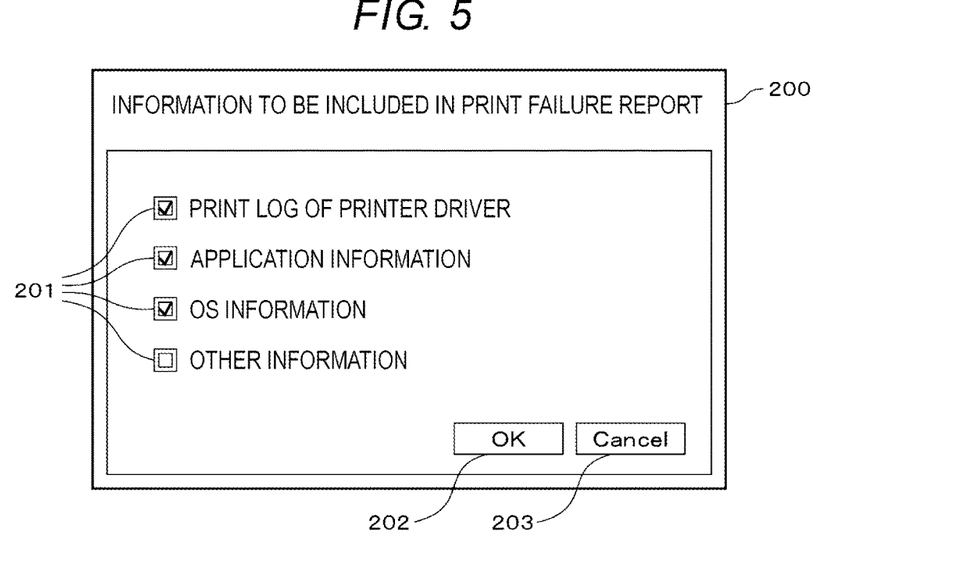
FIG. 5 is a schematic diagram illustrating an example of an information setting screen.

FIG. 5 is a schematic view illustrating an example of the information setting screen 200. As illustrated in FIG. 5, the information setting screen 200 includes a check box 201 for selecting information to be included in the print failure report. The user enters a check in the check box 201 of the desired information. In addition, the information setting screen 200 includes an OK button 202 for instructing the input confirmation and a Cancel button 203 for instructing the input cancellation. In addition, the content of the text data displayed in FIG. 5 is an example.

If the user inputs the OK button 202 of the information setting screen 200, the auxiliary storage device 23 stores the data of the information setting screen 200.

Herein, it is assumed that a similar print failure occurs repeatedly if the user executes printing from the PC 20 to the MFP 10. In the embodiment, the print failure is the fact or the like that, for example, although a certain amount of toner is present in a toner cartridge included in the MFP 10, a toner image is not fixed on a print medium because some print failure occurred on the PC 20. Then, if a similar print failure is expected to occur the next time during the printing, the user considers changing the settings related to the print failure report before executing the print. The user calls a print screen 300 (see FIG. 6) through the input device 25, and the printer driver 211 displays the print screen 300 on the display device 26.

Figure 6:
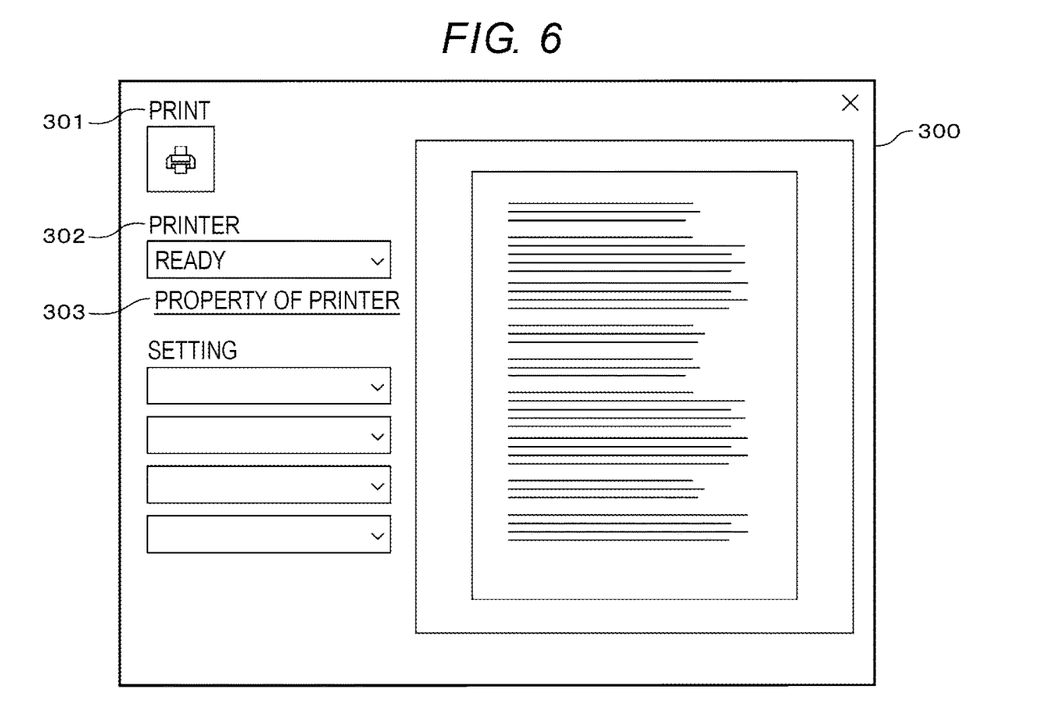
FIG. 6 is a schematic view illustrating an example of a print screen.

FIG. 6 is a schematic view illustrating an example of the print screen 300. As illustrated in FIG. 6, the print screen 300 is a screen for allowing the MFP 10 to execute a print process based on the designated print data of the print object. The print screen 300 includes a print execution button 301 for instructing print execution, a driver designation button 302 for designating the printer driver 211, and a call button 303 for a property screen 400 (refer to FIG. 7). The user selects the call button 303 through the input device 25 to call the property screen 400 and the printer driver 211 displays the property screen 400 on the display device 26.

Figure 7:
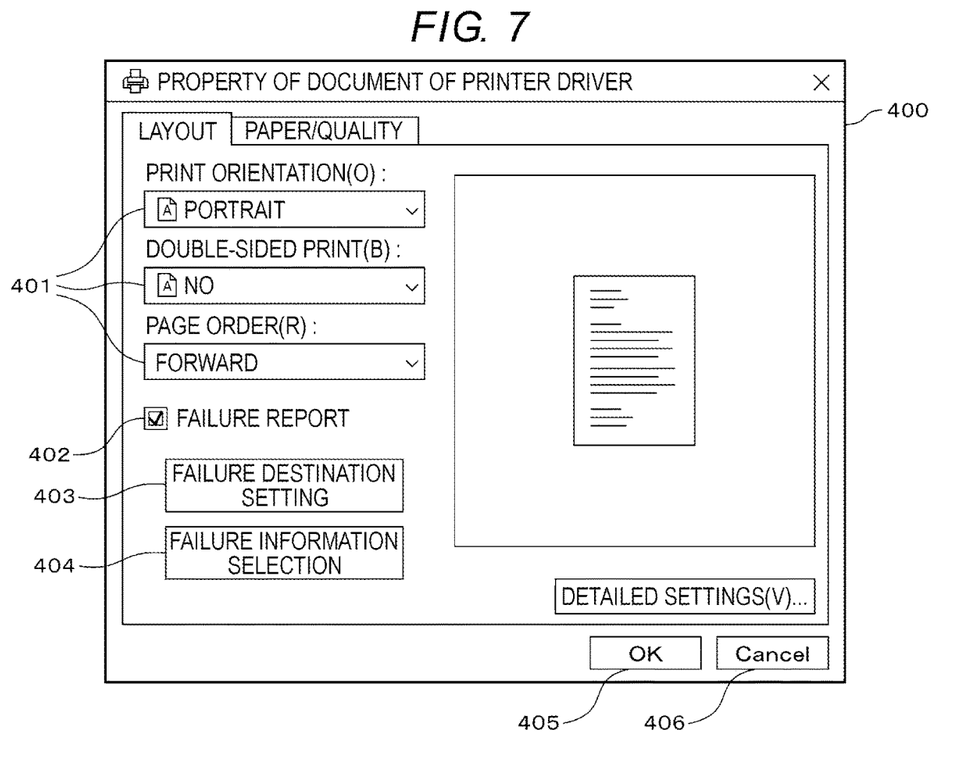
FIG. 7 is a schematic diagram illustrating an example of a property screen.

FIG. 7 is a schematic view illustrating an example of the property screen 400. As illustrated in FIG. 7, the property screen 400 includes items 401 for designating the print setting conditions, a check box 402 for requesting transmission of the print failure report, a failure transmission destination setting button 403, and a failure information selection button 404. The failure transmission destination setting button 403 is a button for calling the destination setting screen 100. The failure information selection button 404 is a button for calling the information setting screen 200. In addition, the property screen 400 includes an OK button 405 for instructing the input confirmation of the items 401 and the check box 402 and a Cancel button 406 for instructing the input cancellation. If the user desires to transmit the print failure report, the user enters a check in the check box 402. After that, the user inputs the print execution button 301 displayed on the print screen 300. In addition, the content of the text data displayed in FIG. 7 is an example.

If the user designates the items 401 on the property screen 400 and enters a check or no check in the check box 402 and then, inputs the OK button 405, the auxiliary storage device 23 stores the data of the property screen 400.

Figure 8:
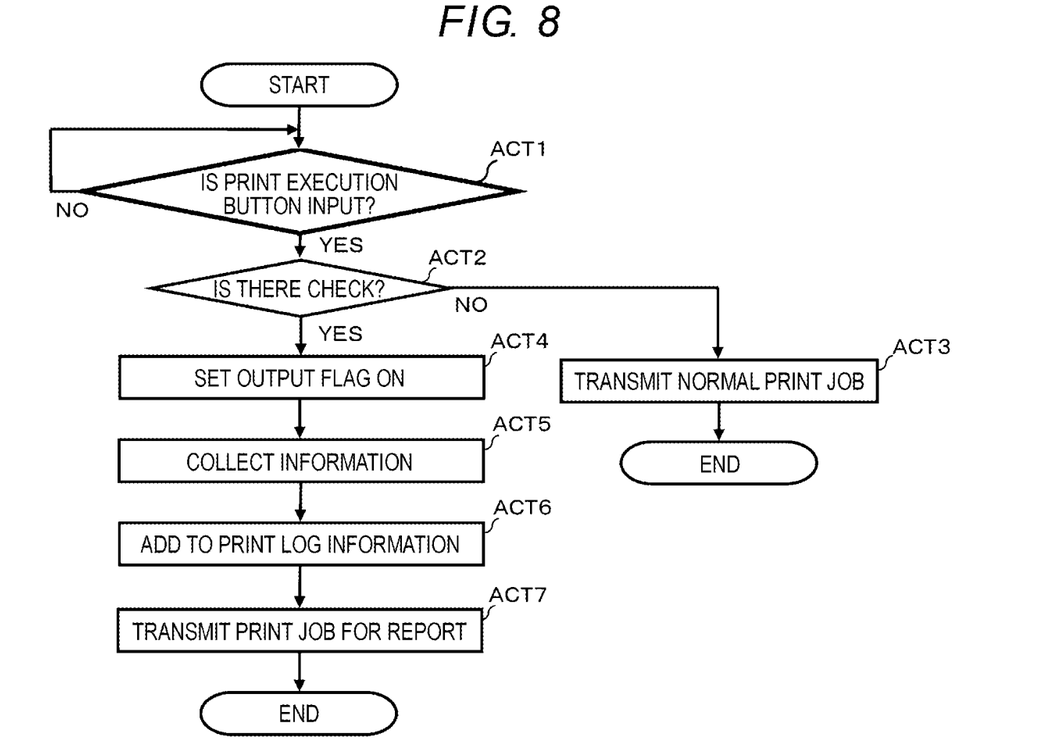
FIG. 8 is a flowchart illustrating a control procedure of a printer driver in the PC.
Figure 9:
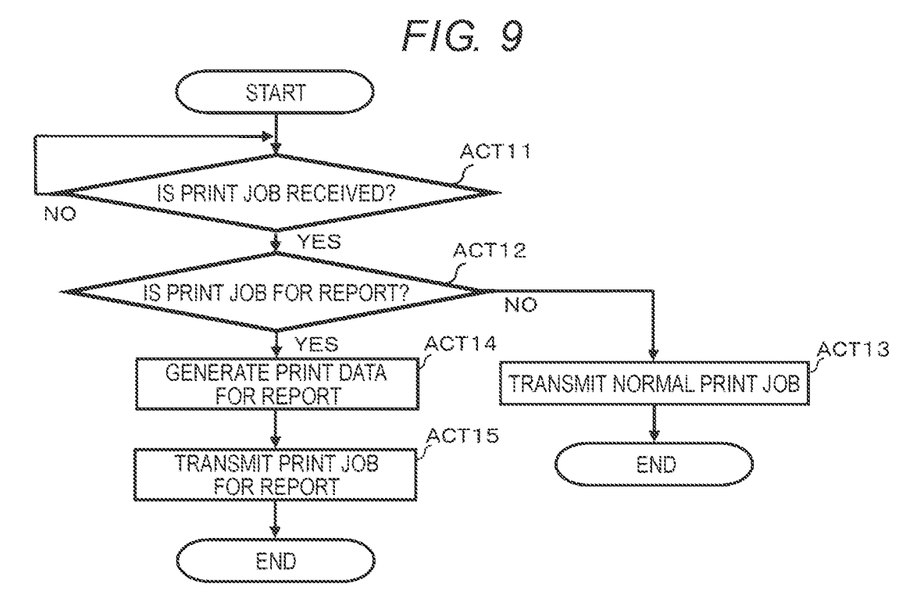
FIG. 9 is a flowchart illustrating a control procedure of a language monitor in the PC.
Figure 10:
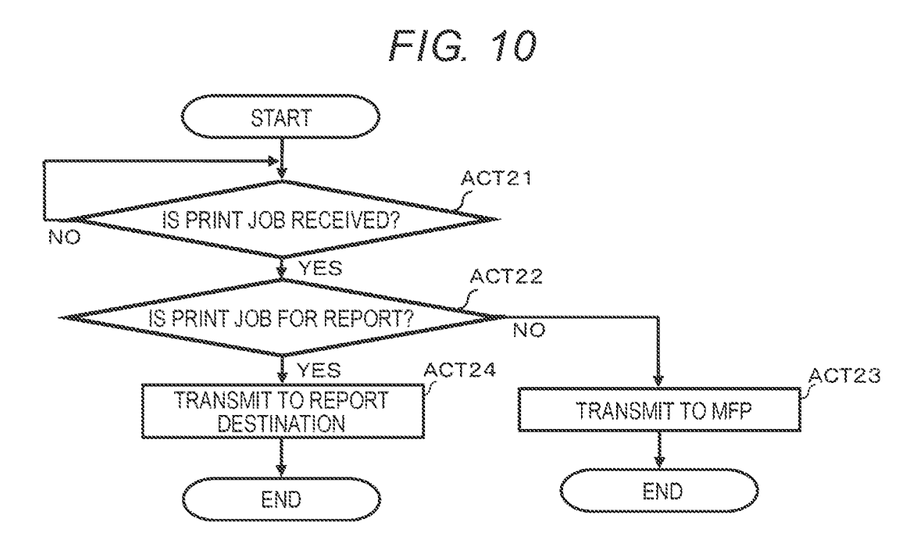
FIG. 10 is a flowchart illustrating a control procedure of a port monitor in the PC.

FIG. 8 is a flowchart illustrating an information processing procedure executed by the printer driver 211 of the PC 20. FIG. 9 is a flowchart illustrating an information processing procedure executed by the language monitor 213 of the PC 20. FIG. 10 is a flowchart illustrating an information processing procedure executed by the port monitor 214 of the PC 20. Hereinafter, the operation of the information processing system 1 will be described with reference to these flowcharts. The operation described below is an example. The procedure is not particularly limited as long as similar results can be obtained.

As ACT 1, the printer driver 211 of the PC 20 waits for the input of the print execution button 301 through the input device 25. If the print execution button 301 was input, the printer driver 211 determines YES in ACT 1, and the process proceeds to ACT 2.

As ACT 2, the printer driver 211 confirms whether or not a check is entered in the check box 402 for requesting transmission of the print failure report based on the data of the property screen 400 stored in the auxiliary storage device 23. The check box 402 is information that designates whether or not to report a failure, that is, mode designation information that designates any one of the print mode and the report mode. The check box 402 in which no check is entered designates the print mode, and the check box 402 in which a check is entered designates the report mode. If a check is not entered in the check box 402, the printer driver 211 determines NO in ACT 2, that is, determines to execute the print mode and the process proceeds to ACT 3. The print mode is a mode in which the MFP 10 is allowed to execute a print process based on the designated print data.

As ACT 3, the printer driver 211 executes the print mode and transmits a normal print job to the language monitor 213 through the spooler 212. The normal print job includes the designated print data of the print object on the print screen 300 through the input device 25 and the data related to the items 401 of the print setting conditions designated on the property screen 400. With the above, the printer driver 211 ends the information processing of the procedure illustrated in the flowchart of FIG. 8.

If a check is entered in the check box 402, the printer driver 211 determines YES in ACT 2, that is, determines to execute the report mode and the process proceeds to ACT 4. The report mode is a mode for transmitting the print data for reporting including the print log information and the like based on the designated print data to the destination. In addition, the print log information and the like are print log information, information of the application program, information of the operating system, other information related to the PC 20, or a combination thereof. The print log information includes, for example, information included in the designated print data of the print object that was printed, date and time, information as to whether the printing succeeded or failed, and the like. The information included in the designated print data is, for example, a file name of the image included in the designated print data or an ID of the image. As ACT 4, the printer driver 211 sets the output flag of the print log information ON and executes the report mode. The output flag is information indicating whether or not the print log information and the like are permitted to be output to the management server 30. If the output flag is ON, the print log information and the like can be output. If the output flag is OFF, the print log information and the like cannot be output.

As ACT 5, the printer driver 211 collects information to be included in the print failure report based on the data of the information setting screen 200 stored in the auxiliary storage device 23. As ACT 6, the printer driver 211 adds the information collected in the process of ACT 5 to the print log information.

As ACT 7, the printer driver 211 transmits the print job for reporting to the language monitor 213 through the spooler 212. The print job for reporting includes the designated print data of the print object on the print screen 300, the data related to the items 401 of the print setting conditions designated on the property screen 400, and the print log information and the like.

With the above, the printer driver 211 ends the information processing of the procedure illustrated in the flowchart of FIG. 8.

As ACT 11, the language monitor 213 of the PC 20 waits for the reception of the print job from the spooler 212. If the print job is received, the language monitor 213 determines YES in ACT 11 and the process proceeds to ACT 12.

As ACT 12, the language monitor 213 confirms whether or not the received print job is a print job for reporting. If the print job is not a print job for reporting, that is, the print job is a normal print job, the language monitor 213 determines NO in ACT 12 and the process proceeds to ACT 13.

As ACT 13, the language monitor 213 transmits the normal print job to the port monitor 214. With the above, the language monitor 213 ends the information processing of the procedure illustrated in the flowchart of FIG. 9.

If the print job is a print job for reporting, the language monitor 213 determines YES in ACT 12 and the process proceeds to ACT 14. As ACT 14, the language monitor 213 generates the print data for reporting. That is, the print data for reporting generated by the language monitor 213 is data obtained by adding print log information and the like included in the print job for reporting from the printer driver 211 to the designated print data included in the same job.

As ACT 15, the language monitor 213 transmits the print job for reporting to the port monitor 214. That is, the print job for reporting transmitted in ACT 15 includes the print data for reporting generated by the process of ACT 14 and the data related to the items 401 of the print setting conditions designated on the property screen 400. With the above, the language monitor 213 ends the information processing of the procedure illustrated in the flowchart of FIG. 9.

As ACT 21, the port monitor 214 of the PC 20 waits for the reception of the print job from the language monitor 213.

If the print job is received, the port monitor 214 determines YES in ACT 21 and the process proceeds to ACT 22.

As ACT 22, the port monitor 214 confirms whether or not the received print job is a print job for reporting. For example, a print job includes identification information indicating a normal print job or a print job for reporting. If it is determined that the print job is not a print job for reporting, that is, the print job is a normal print job, based on the identification information, the port monitor 214 determines NO in ACT 22 and the process proceeds to ACT 23.

As ACT 23, the port monitor 214 transmits the print data included in the normal print job to the MFP 10 via the communication network 2. That is, the port monitor 214 instructs the MFP 10 to print the print data. With the above, the port monitor 214 ends the information processing of the procedure illustrated in the flowchart of FIG. 10.

In the case of a print job for reporting, the port monitor 214 determines YES in ACT 22 and the process proceeds to ACT 24. As ACT 24, the port monitor 214 transmits the print data for reporting included in the print job for reporting to the management server 30 via the communication network 2 based on the data of the destination setting screen 100 stored in the auxiliary storage device 23. That is, the port monitor 214 instructs the management server 30 to report the print failure report to the administrator or the service person. With the above, the port monitor 214 ends the information processing of the procedure illustrated in the flowchart of FIG. 10.

As is clarified from the above description, the PC 20 as an information processing apparatus includes the input interface 27, the communication interface 24, and the processor 21. The processor 21 functions as the printer driver 211, the spooler 212, the language monitor 213, and the port monitor 214. The input interface 27 receives the settings related to the print failure report. The communication interface 24 communicates with the MFP 10 as an image forming apparatus and the management server 30 as a destination of the print failure report.

The PC 20 selectively executes the print mode and the report mode by the port monitor 214 executing the process of ACT 23 or ACT 24 of FIG. 10.

Therefore, in the case of the PC 20, if the settings related to the print failure report are performed on the destination setting screen 100, the information setting screen 200, and the property screen 400 (when the transmission is designated with a check in the check box 402), the print data for reporting to which the print log information and the like included in the print failure report are added is transmitted to the destination of the print failure report. Therefore, it is not necessary for the user or the service person to generate the print failure report and the print failure report can be efficiently generated and reported. For this reason, the burden on the user or the service person is reduced. In addition, if the print failure report is not set (when the transmission is not designated by a check in the check box 402), the print data is printed as normal. Therefore, the user can select whether or not to transmit the print failure report and select the information to be included in the print failure report with simple input. By setting whether or not to transmit the print failure report, it is possible to prevent information leakage against the user's intention.

Although the embodiment of the information processing apparatus has been described above, the embodiment is not limited thereto.

In the above-described embodiment, the case where the image forming apparatus is the MFP 10 is exemplified. The image forming apparatus is not limited to the MFP 10. For example, the image forming apparatus may be a copier, a printer, or the like.

In the above-described embodiment, the case where the OK button 405 and the Cancel button 406 are displayed on the property screen 400 is exemplified. For example, along with the OK button 405 and the Cancel button 406, a Transmit button for requesting transmission of the print failure report may be displayed. That is, the OK button 405 may be distinguished as instructing the input confirmation of the print setting conditions or the like, and the Transmit button may be distinguished as instructing the input confirmation of the check box 402. In this case, the Transmit button may be enabled if a check is entered in the check box 402.

In addition, as another example, the processor 21 may determine whether or not the print failure report needs to be transmitted and execute the report mode based on the determination result. For example, the printer driver 211, the language monitor 213, and the port monitor 214 monitor the occurrence of a failure during the execution of the print process. If any of the printer driver 211, the language monitor 213, and the port monitor 214 detects a failure in the execution of the print process, the processor 21 determines to transmit the print failure report and executes the report mode. The printer driver 211 detects a print failure from an error of a set value included in the print setting conditions. The language monitor 213 and the port monitor 214 detect a print failure from a time over of the process. If the processor 21 detects the failure in the execution of the print process based on predetermined designated print data, the processor 21 executes the report mode and transmits the print data for reporting including the print log information and the like based on the predetermined designated print data to the destination. As a result, it is possible to automate the process from the occurrence of the failure to the transmission of the print failure report.

Furthermore, the processor 21 may count the detection of the print failure and execute the report mode if a count value exceeds a threshold value. In addition, the processor 21 may count the detection of the print failure by type and execute the report mode if any of the count values for each type exceeds the threshold value. After executing the report mode, the processor 21 resets the count value.

Furthermore, the input interface 27 may output information related to confirmation of intention to receive the execution instruction of the report mode if a failure is detected in the execution of the print process. That is, if a failure is detected, the display device 26 displays a confirmation button for confirming the intention to transmit the print failure report; and if the input device 25 detects the selection of the confirmation button, the processor 21 executes the report mode. Accordingly, it is possible to confirm the user's intention to transmit the print failure report in addition to automating the process from the occurrence of the failure to the transmission of the print failure report.

While certain embodiments have been described, these embodiments have been presented by way of example only, and are not intended to limit the scope of invention. Indeed, the novel apparatus and methods described herein may be embodied in a variety of other forms; furthermore, various omissions, substitutions and changes in the form of the apparatus and methods described herein may be made without departing from the spirit of the inventions. The accompanying claims and their equivalents are intended to cover such forms or modifications as would fall within the scope and spirit of the inventions.

What is claimed is:

1. An information processing apparatus comprising:
   an input interface configured to receive settings related to a print failure report;
   a communication interface configured to facilitate communication with an image forming apparatus and a destination of the print failure report identified in the settings; and
   a processor configured to selectively execute a print mode for transmitting designated print data of a print object to the image forming apparatus and a report mode for transmitting print data for reporting including print log information to the destination based on the settings;
   wherein the input interface is configured to provide an information setting screen including a plurality of check boxes for selecting information to be included in the print failure report;
   wherein the input interface is configured to provide a print execution button and a failure report check box; and
   wherein, when the print execution button is selected, the processor is configured to (a) collect the information to be included in the print failure report based on which of the plurality of check boxes are selected, add the information to the print log information, transmit the print failure report to the destination, and not transmit a print command to a printer to perform a print job if the failure report check box is selected and (b) transmit the print command to the printer to perform the print job if the failure report check box is not selected.

2. The information processing apparatus of claim 1, wherein the information that is selectable via the plurality of check boxes includes the print log information, information regarding an application program or operating system of the information processing apparatus, and other information related to the information processing apparatus.

3. The information processing apparatus of claim 1, wherein the print mode is a mode for allowing the image forming apparatus to execute a print process based on the designated print data, and wherein the report mode is a mode for transmitting the print data for reporting including the print log information based on the designated print data to the destination.

4. The information processing apparatus of claim 3, wherein the print data for reporting includes the designated print data.

5. The information processing apparatus of claim 1, wherein the processor is further configured to execute the report mode when a failure is detected in the execution of a print process.

6. The information processing apparatus of claim 1, wherein, when a failure is detected in the execution of a print process based on the designated print data, the processor is further configured to execute the report mode for transmitting the print data for reporting including the print log information based on the designated print data to the destination.

7. The information processing apparatus of claim 6, wherein the processor is further configured to detect a print failure from a time for a printing process.

8. The information processing apparatus of claim 6, wherein the processor is further configured to count a number of times a print failure is detected and execute the report mode if the number of times the print failure is detected exceeds a threshold value.

9. A method for providing a print failure report, the method comprising:
   receiving, by a processor of a computer, a print request for a print job including print data regarding a print object;
   providing, by the processor on a display of the computer, a print setting interface including (i) a plurality of print job setting items that facilitate entering print settings for the print job, (ii) a failure report check box that facilitates requesting transmission of the print failure report, (iii) a failure destination button that, when selected, provides a failure destination selection interface that facilitates inputting a destination for the print failure report, and (iv) a failure information button that, when selected, provides a failure information selection interface that includes a plurality of check boxes that facilitate selecting information to be provided with the print failure report;
   receiving, by the processor from an input interface of the computer, a print execution input for the print job;
   in response to receiving the print execution input and the failure report check box not being selected, transmitting, by the processor via a communications interface of the computer, a print command to a printer to perform the print job, the print command including the print data and the print settings; and in response to receiving the print execution input and the failure report check box being selected:
  collecting, by the processor, the information to be included in the print failure report based on which of the plurality of check boxes are selected; and
  transmitting, by the processor via the communications interface, the print failure report to the destination and not the print command to the printer.

10. The method of claim 9, further comprising detecting, by the processor, a failure in the execution of the print job.

11. The method of claim 10, further comprising collecting, by the processor, the information in response to detecting the failure.

12. The method of claim 10, wherein the processor is configured to automatically transmit the print failure report to the destination in response to (i) the transmission of the print failure report being selected via the print setting interface and (ii) the failure in the execution of the print job being detected.

13. The method of claim 10, further comprising providing, by the processor on the display, a confirmation request regarding transmission of the print failure report in response to the failure in the execution of print by being detected.

14. The method of claim 13, wherein the processor is configured to transmit the print failure report to the destination in response to (i) the transmission of the print failure report being selected via the print setting interface, (ii) the failure in the execution of the print job being detected, and (iii) the confirmation request being approved.

15. The method of claim 9, wherein the information that is selectable via the plurality of check boxes includes print log information, information regarding an application program on the computer, information regarding an operating system of the computer, and other information related to the computer.

16. An information processing apparatus comprising:
a display;
an input interface;
a communication interface; and
a processor configured to:
  receive a print request for a print job including print data regarding a print object;
  provide a print setting interface on the display that includes (i) a plurality of print job setting items that facilitate entering print settings for the print job, (ii) a failure report check box that facilitates requesting transmission of the print failure report, (iii) a failure destination button that, when selected, provides a failure destination selection interface that facilitates inputting a destination for the print failure report, and (iv) a failure information button that, when selected, provides a failure information selection interface that includes a plurality of check boxes that facilitate selecting information to be provided with the print failure report;
  receive a print execution input for the print job via the input interface;
  in response to receiving the print execution input and the failure report check box not being selected, transmit a print command to a printer via the communication interface to perform the print job in response to receiving the print execution input, the print command including the print data and the print settings; and
  in response to receiving the print execution input and the failure report check box being selected:
    collect the information to be included in the print failure report based on which of the plurality of check boxes are selected; and
    transmit the print failure report to the destination via the communication interface and not the print command to the printer.

17. The information processing apparatus of claim 16, wherein the processor is configured to detect a failure in the execution of the print job.

18. The information processing apparatus of claim 17, wherein the processor is configured to automatically transmit the print failure report to the destination in response to (i) the transmission of the print failure report being selected via the print setting interface and (ii) the failure in the execution of the print job being detected.

19. The information processing apparatus of claim 17, wherein the processor is configured to provide a confirmation request on the display regarding transmission of the print failure report in response to the failure in the execution of print by being detected.

20. The information processing apparatus of claim 19, wherein the processor is configured to transmit the print failure report to the destination in response to (i) the transmission of the print failure report being selected via the print setting interface, (ii) the failure in the execution of the print job being detected, and (iii) the confirmation request being approved.

* * * * *